(12) United States Patent
Walter et al.

(10) Patent No.: US 6,745,891 B2
(45) Date of Patent: Jun. 8, 2004

(54) CONVEYOR DEVICE, ESPECIALLY SUSPENDED CONVEYOR DEVICE

(75) Inventors: Braunmüller Walter, Kaufering (DE); Lutsch Wilhelm, Landsberg (DE)

(73) Assignee: WF Logistik GmbH, Landsberg (DE)

( * ) Notice: Subject to any disclaimer, the term of this patent is extended or adjusted under 35 U.S.C. 154(b) by 0 days.

(21) Appl. No.: 10/296,941

(22) PCT Filed: Jun. 25, 2001

(86) PCT No.: PCT/EP01/07192
§ 371 (c)(1),
(2), (4) Date: Dec. 10, 2002

(87) PCT Pub. No.: WO02/00484
PCT Pub. Date: Jan. 3, 2002

(65) Prior Publication Data
US 2003/0150696 A1 Aug. 14, 2003

(30) Foreign Application Priority Data
Jun. 26, 2000 (DE) .......................................... 100 31 033

(51) Int. Cl.⁷ .......................... B65G 23/16; B61B 10/02
(52) U.S. Cl. ............................ 198/465.4; 198/687.1; 198/683; 104/172.4
(58) Field of Search ............................ 198/687.1, 683, 198/678.1, 465.4, 465.1, 686; 104/172.4

(56) References Cited

U.S. PATENT DOCUMENTS

| | | | |
|---|---|---|---|
| 2,973,721 A | 3/1961 | Wagter | |
| 3,795,200 A | 3/1974 | Mormile et al. | |
| 4,250,988 A | 2/1981 | Miaskoff | |
| 4,351,241 A * | 9/1982 | Brems et al. | 104/93 |
| 4,930,425 A * | 6/1990 | Ponisch et al. | 104/172.4 |
| 4,942,956 A * | 7/1990 | Acker et al. | 198/465.3 |
| 5,038,900 A * | 8/1991 | Durant et al. | 198/465.4 |
| 5,231,932 A | 8/1993 | Enderlein et al. | |
| 5,450,942 A * | 9/1995 | Johann et al. | 198/465.4 |
| 5,819,906 A * | 10/1998 | Enderlein et al. | 198/687.1 |
| 6,241,082 B1 * | 6/2001 | Vanmeenen et al. | 198/845 |
| 6,270,076 B1 * | 8/2001 | Reist | 271/302 |
| 6,341,686 B1 * | 1/2002 | Beyer | 198/680 |
| 6,554,127 B1 * | 4/2003 | Kroll | 198/465.4 |
| 6,675,954 B2 * | 1/2004 | Taeger | 198/687.1 |

FOREIGN PATENT DOCUMENTS

| | | |
|---|---|---|
| DE | 2523060 A | 12/1976 |
| DE | 4017821 A | 12/1990 |
| DE | 9206550 U | 7/1993 |
| DE | 19834451 A | 2/2000 |

* cited by examiner

Primary Examiner—Douglas Hess
(74) Attorney, Agent, or Firm—Rothwell, Figg, Ernst & Manbeck, P.C.

(57) ABSTRACT

The invention proposes a suspension-type conveying arrangement in the case of which conveyable-article carriers (1) are supported, by way of running rollers (9) on guide rails (3) for movement along a conveying route. Arranged on a drag chain/drive chain (15) guided along the conveying route are driver elements (17), preferably brush elements (17), which can be moved between a driving position and a non-driving position. The invention proposes various concepts in order, in the case of a build-up of conveyable-article carriers (1), to transfer the driver elements (17) into the non-driving position, with the result that they act on the built-up conveyable-article carriers (1) at most to a slight extent, if at all. In the driving position, it is possible for driver elements (17) to act on the conveyable-article carriers (1) in order to drive them along the conveying route.

6 Claims, 6 Drawing Sheets

CONVEYOR DEVICE, ESPECIALLY SUSPENDED CONVEYOR DEVICE

CROSS-REFERENCE TO RELATED APPLICATION

This application is a National Stage entry of International Application No. PCT/EP01/07192, filed Jun. 25, 2001, the entire specification claims and drawings of which are incorporated herewith by reference.

DESCRIPTION

The invention relates to a conveying arrangement, in particular suspension-type conveying arrangement, having rails for guiding conveyable-article carriers, equipped with running rollers, along a conveying route, having a drive belt which is driven in circulation about diverting means, is guided along the conveying route, at least in certain regions, by means of a guide arrangement and has driver elements which are arranged on it and, in a driving position, are suitable, and envisaged, for driving rail-guided conveyable-article carriers along the conveying route, and having means for stopping conveyable-article carriers in a build-up region of the conveying route as the drive belt continues running.

A generic suspension-type conveying arrangement of the type mentioned above is described, for example, in EP 0 516 971 B1. In the case of this known conveying arrangement, the conveyable-article carriers have two running rollers which are arranged in a rotatable manner at the free leg ends of a V-shaped or U-shaped bracket and are oriented obliquely in relation to one another, with the result that they can roll on the running surfaces of a gable-roof-like guide rail along a relevant conveying route, the bracket extending beneath the running rail. The known suspension-type conveying arrangement has, as drive belt, a plate link chain which is guided in a chain guide along the conveying route. For coupling the conveyable-article carriers to the drive chain, use is made of driver fingers which are provided at certain intervals on the drive chain, the driver fingers projecting laterally from the drive chain, in a direction transverse to the running direction of the conveyable-article carriers, and into the path of the conveyable-article carriers. If the drive chain is then driven in order to move along the conveying route, a respective driver finger can act on a conveyable-article carrier which may be present on the guide rail, and push or drive it along the conveying route, the conveyable-article carrier being guided on the guide rail by way of its running rollers. The driver fingers are individual, inherently elastic flat-bar elements which are made of plastic, can be deflected with yielding action and are connected, via a region of increased elasticity, to a respective driver-retaining part of the drive chain. The elasticity of a respective driver finger is intended to ensure certain damping, in the case of the driver finger acting on the conveyable-article carrier, if the driver finger comes into contact with a stop region provided rigidly on the conveyable-article carrier. Furthermore, it is possible for a relevant elastic driver finger, in the case of the conveyable-article carrier stopping as the drive chain continues to run, to be deflected to the extent where it disengages from the conveyable-article carrier, with the result that, in a situation where the conveyable-article carriers build up, the drive belt can continue running without the relevant conveyable-article carriers or driver fingers being destroyed. However, each time a driver finger passes as the drive chain continues running, a conveyable-article carrier which has been stopped or is located in a built-up formation, is subjected to contact impact. This may result in undesired vibrations, in increased wear to elements of the conveying arrangement and in the development of aggravating noise. It is also the case that it is not possible for the abovementioned disadvantageous effects to be prevented by the elasticity of the driver fingers.

Also known are suspension-type conveying arrangements of the type mentioned in the introduction in the case of which brush elements are spaced apart from one another at certain intervals on a drive belt in the form of a drive chain, the brush elements serving as driver elements for driving conveyable-article carriers. As in the case of the driver finger described with reference to EP 0 516 971 B1, the bristles of the brush elements are also intended to provide damping action in the case of the driver elements acting on a conveyable-article carrier in order to drive it along the conveying route. In the case of intended or unintended stoppage of the conveyable-article carriers, however, it is also the case that such brush elements subject the conveyable-article carriers to contact impact, this resulting in corresponding vibration with the disadvantages which have already been described above.

German patent application 100 05 646 describes a suspension-type conveying arrangement with brush elements on a drive chain for driving conveyable-article carriers, said conveying arrangement having the special feature that the conveyable-article carriers have pivotable coupling elements in order to be subjected to the action of the brush elements. Build-up formation results in the coupling elements of the conveyable-article carriers which come into contact with one another being pivoted, under the build-up pressure, into a passive position, in which they are not engaged by the brush elements of the continuing drive chain, with the result that the above-mentioned contact impact is largely avoided.

The object of the invention is to demonstrate further ways in which, in the case of a conveying arrangement of the type mentioned in the introduction, impact loading of the conveyable-article carriers in the case of a build-up can be at least largely avoided.

According to a first embodiment of the invention, in order to achieve this object, it is proposed that the conveying arrangement have position-changing means which can be activated in a controlled manner and are intended for transferring driver elements of the drive belt from their driving position into a non-driving position in the build-up region, it being possible for the driver elements located in the non-driving position, if appropriate, only to engage with a slight degree of coupling, if at all, and with easily yielding action with built-up conveyable-article carriers.

The driver elements transferred into the non-driving position, in the build-up region, are guided past built-up conveyable-article carriers such that they subject the conveyable-article carriers, at most, to extremely weak contact impact, if any at all.

It is thus possible to have built-up operation which does not adversely effect the conveying arrangement as the drive belt continues running.

The advantages of the invention are still utilized even when individual driver elements cannot be shifted into the non-driving position or, in their non-driving position, nevertheless come into contact with built-up conveyable-article carriers.

According to a preferred embodiment of the invention, the position-changing means comprise controllable means for changing the guide path of the drive belt in a reversible manner, said controllable means being designed for diverting the drive belt in the build-up region of the conveying route optionally from a path in which the driver elements are guided into the driving position into a path in which the driver elements are guided into the non-driving position. This configuration of the invention makes it possible to divert the drive belt in the build-up region if required, with the result that driver elements can pass the build-up region along the conveying route without actively engaging with built-up conveyable-article carriers. According to a variant of this embodiment of the invention, the deflecting means are configured such that they keep the drive belt away from built-up conveyable-article carriers, over more or less the entire length of the build-up region, to the extent where the driver elements, in the build-up region, can only act, at most, to a slight extent, if at all, and with yielding action on the conveyable-article carriers. In order to disperse a build-up of conveyable-article carriers, the deflecting means can be controlled such that they guide the drive belt again so that driver elements can engage with conveyable-article carriers in order to drive them.

According to a further variant of the configuration of the invention mentioned above, it is provided that the means for changing the guide path in the build-up region are arranged, and can be activated, along the conveying route such that they divert the drive belt, at predetermined locations of the conveying route, into the path in which the driver elements are guided into the non-driving position, said predetermined locations corresponding to the locations in which, in the event of a build-up of conveyable-article carriers, are located those regions of the conveyable-article carriers which are to be subjected to the action of the driver elements for the driving coupling between conveyable-article carriers and drive belts. Once these locations have been bypassed, the drive belt is diverted in the opposite direction again in each case and guided normally along the conveying route. In the case of such a locally restricted redirection of the drive belt, the driver elements in each case bypass the stop regions of the conveyable-article carriers in the build-up. In order to disperse a build-up, the effect of diverting the drive belt is reversed again, with the result that driver elements can then engage with the previously built-up conveyable-article carriers in order to drive them. According to a development of the last-mentioned variant of the invention, the means for changing the guide path have deflecting guide elements which deflect the drive belt locally in a guided manner from the path in which the driver elements are guided into the driving position into a path in which the driver elements are guided into the non-driving position, it being possible for the deflecting guide elements, in a respective displacement region, to be displaced in a controlled manner along the conveying route in order to vary the respective location of the deflection of the drive belt. The deflecting guide elements can preferably be displaced in each case between two end positions in the longitudinal direction of the conveying route, one of these end positions corresponding to a position in which a stop region of a conveyable-article carrier located in the build-up is bypassed, whereas the other end position is selected such that the abovementioned bypass is eliminated and the driver elements can engage with the stop regions of the conveyable-article carriers again.

The invention preferably relates, in all configurations, to a suspension-type conveying arrangement with conveyable-article carriers which have at least one running-gear mechanism with a V-shaped or U-shaped bracket, running rollers being arranged in a rotatable manner at the free leg ends of the bracket and being oriented obliquely in relation to one another, with the result that they can roll on running surfaces of gable-roof-like guide rails along a relevant conveying route, the bracket extending beneath the guide rail. The conveyable-article carriers in question here preferably comprise at least two running-gear mechanisms of the abovementioned type, which are connected to one another at their bottom ends by a carrying rod for conveyable articles, the conveyable-article carriers preferably being of the same dimensions and, in particular at a predetermined location of their longitudinal extent, having a stop region for driver elements of the drive belt. According to a preferred embodiment of the invention, the drive-belt guide is configured in relation to the extent of the guide rails such that a respective driver element guided into the driving position can engage behind a respective rail-guided conveyable-article carrier on the bracket leg of a running-gear mechanism in order to drive the same along the conveying route.

According to a particularly preferred configuration of the invention, in all the embodiments, the drive belt is a drive chain, in particular plate link chain, with driver elements arranged thereon. The driver elements located in the driving position project, for example, laterally from the drive chain (conveying chain), with the result that they extend into the path of the rail-guided conveyable-article carriers in order to be able to engage with conveyable-article carriers. The driver elements are preferably driver fingers which can be deflected with elastic yielding action. These should be of such a nature that, after overcoming a certain opposing force, they can move away from a conveyable-article carrier which has been blocked unintentionally, for example, outside a build-up region, and can overcome engagement with the conveyable-article carrier, without causing spontaneous damage.

The driver fingers may be combined in groups to form driver brushes, the driver-brush elements preferably being arranged on the drive belt such that they follow equidistantly one after the other.

In an alternative configuration, the drive belt could be provided with driver bristles without any significant spacings being formed therebetween.

According to a further preferred configuration of the invention, the driver elements are mounted on the drive belt such that they can be moved relative to the drive belt between the driving position and the non-driving position. In the case of such a solution, there is thus no need to influence the drive-belt guidance in order to transfer driver elements, in the case of a build-up of conveyable-article carriers, into the non-driving position, in which they can undergo coupling or engagement with relevant conveyable-article carriers at most to a slight extent, if at all. Rather, the driver elements are transferred into the non-driving position by the driver elements being moved relative to the drive belt. For this purpose, it is provided that the position-changing means, which can be activated in a controlled manner, have position guiding elements which are arranged at least in certain sections along the build-up region and are designed for influencing driver elements, which are carried along the conveying route by the drive belt, such that the driver elements are transferred from the driving position into the non-driving position at least at predetermined locations along the build-up region.

The position guiding elements are preferably cam elements against which the driver elements moved along by the drive belt butt or are supported (if appropriate under spring prestressing). In accordance with the course taken by the cam or cams, driver elements can thus be moved between their driving position and their non-driving position.

Cam sections are provided in the build-up region, at least at certain locations, and result in the driver elements being transferred into the non-driving position. These certain locations are the locations at which, in the event of a build-up, are located stop regions of the conveyable-article carriers for the driving coupling by driver elements. These stop regions are thus bypassed by the driver elements. A switchable stopper element is usually provided at the front end of the build-up region, this stopper element, in its active position, constituting a barrier for the conveyable-article carriers. The cam sections can preferably be displaced in a controlled manner in the conveying direction and/or transversely thereto in order to vary conditions for the engagement between driver elements and conveyable-article carriers, for example for the purpose of dispersing a build-up again once the stopper element has been transferred into the passive position.

The driver elements may be arranged in a pivotable manner on the drive belt. In another configuration, it is possible for the driver elements to be arranged on the drive belt such that they can be linearly displaced transversely to the respective direction of the conveying route.

Within the context of the invention, it may be provided that separate driver elements always remain in the driving position or, even in their non-driving position, can produce easily yielding engagement with conveyable-article carriers or a slight degree of coupling with conveyable-article carriers, whereas the driver elements located therebetween bypass the conveyable-article carriers in their non-driving position.

The invention also relates, under a further aspect, to a conveying arrangement, in particular suspension-type conveyor arrangement, having rails for guiding conveyable-article carriers, equipped with running rollers, along a conveying route, having a drive belt which is guided, at least in certain regions, along the conveying route and has driver elements which are arranged on it and, in a driving position, are suitable, and envisaged, for driving rail-guided conveyable-article carriers. In order to achieve the above-mentioned object, this conveying arrangement is characterized in that the driver elements on the drive belt can be transferred in each case from the driving position into a non-driving position, and in that each driver element is assigned a respective build-up sensor which is carried along on the drive belt and is intended for detecting built-up conveyable-article carriers, the build-up sensors being designed for transferring the driver elements assigned to them into the non-driving position directly, or possibly indirectly via a controlled arrangement, when a buildup of conveyable-article carriers is detected.

Each build-up sensor preferably has a contour-follower element which is mounted on the drive belt such that it can be moved between a normal position, which corresponds with the driving position of the associated driver element, and a yielding position, which corresponds with the non-driving position of the driver element, the contour-follower element having a cam section by means of which it extends, in the normal position, into the path of conveyable-article carriers guided by rails along the conveying route, with the result that, when the cam section comes into contact with a group of built-up conveyable-article carriers, the contour-follower element can move away from contours of the conveyable-article carriers, in a controlled manner, into the yielding position in order to transfer the associated driver element into the non-driving position, and to keep it in the non-driving position until it has been moved past the group of built-up conveyable-article carriers.

The driver elements are preferably arranged directly on the contour-follower elements. According to one embodiment of the invention, the contour-follower elements are arranged on the drive belt by means of a pivoting mount such that they can be pivoted between the normal position and the yielding position. It is possible here for the contour-follower elements to be mounted in a pivotable manner on the drive belt such that the pivot pins, in accordance with the respective course taken by the conveying route, are oriented parallel or (in the case of the course taken by the conveying route being closed) tangentially to the conveying route, the pivoting mounts being mounted on the drive belt such that the contour-follower elements are loaded, under the action of gravitational force, in the direction of their normal position.

In the case of all of the configurations of the present invention, the drive belt is preferably a drive chain, in particular plate link chain.

The driver elements are preferably driver fingers which can be deflected with elastic yielding action. Driver elements in the form of brush elements with driver bristles are particularly preferred.

Exemplary embodiments of the invention are explained in more detail hereinbelow with reference to the figures, in which.

Figure 1:
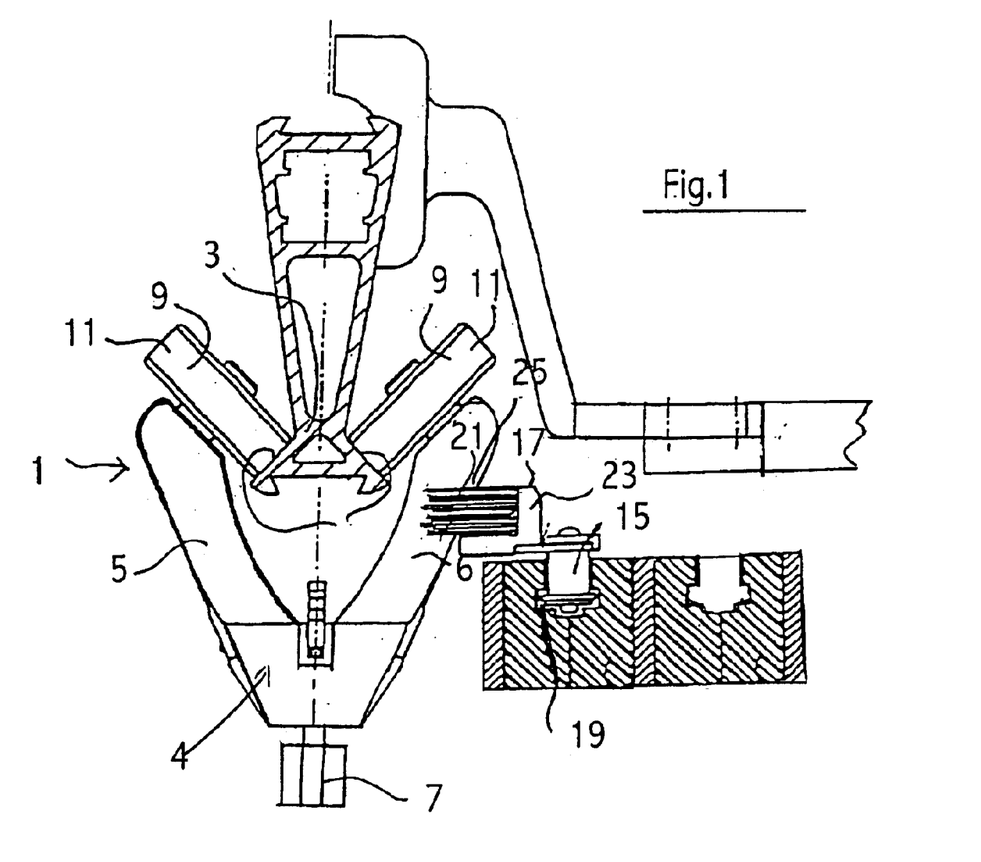
FIG. 1 shows a suspension-type conveying arrangement according to the invention, illustrated partly in cross section, with a conveyable-article carrier in rear view.
Figure 2:
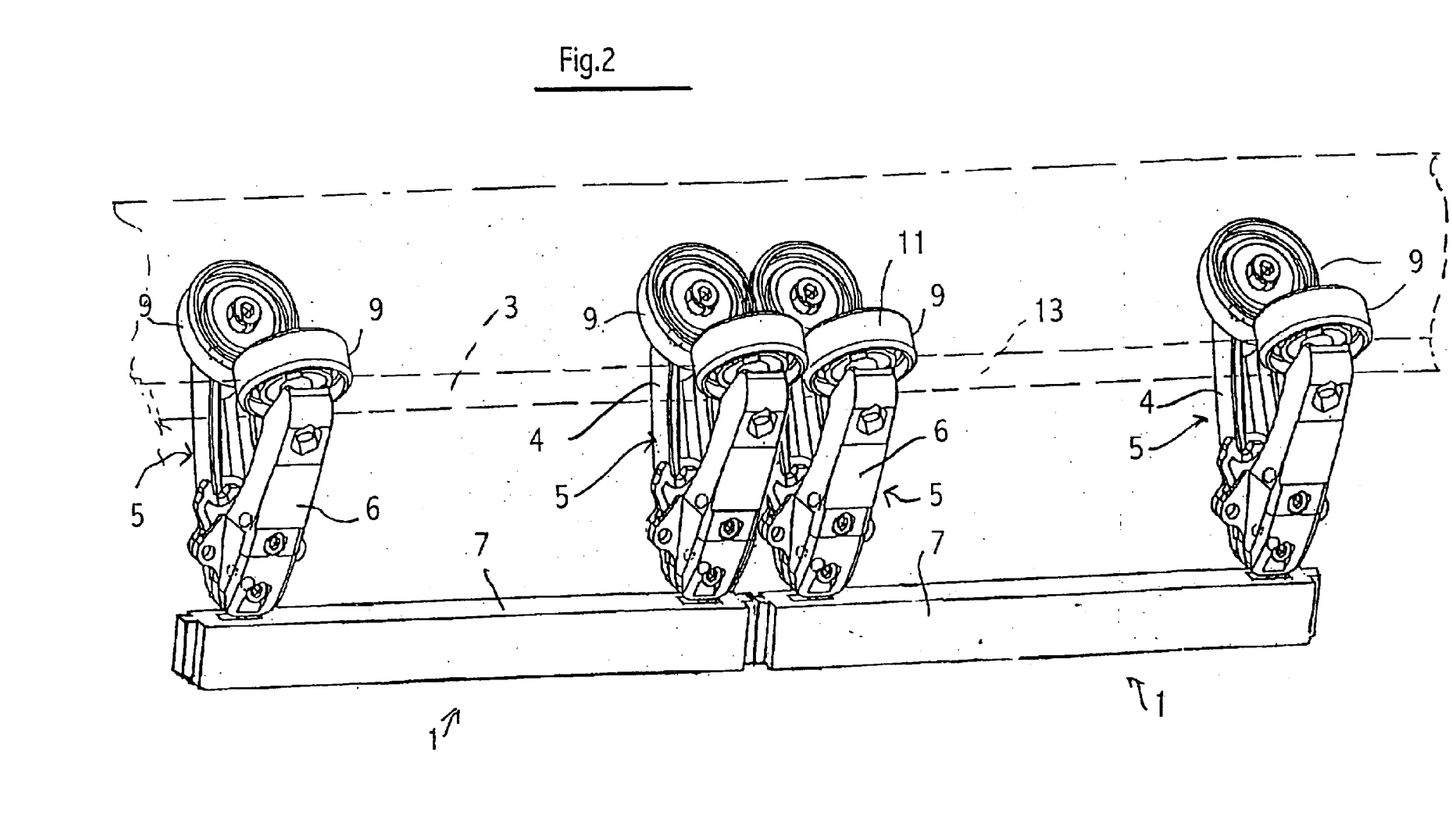
FIG. 2 shows a perspective view of two adjacent conveyable-article carriers butting against one another in a build-up position, drive means not having been illustrated.

FIG. 1 shows a conveyable-article carrier 1, in rear view, on a running rail 3, which is illustrated in cross section. The conveyable-article carrier 1 comprises two running-gear mechanisms 5, which are connected to one another at their bottom ends by a common conveyable-article carrying rod 7 (see also FIG. 2). Of the running-gear mechanisms 5 located one behind the other on the running rail 3, only one, namely the rear running-gear mechanism 5, can be seen in the view according to FIG. 1. The running-gear mechanisms 5, which correspond to one another, have a respective V-shaped bracket 4 which, in the intended conveying position on the running rail 3, extends beneath the running rail 3, with the result that the two running rollers 9, which are mounted at the leg ends of the bracket 4 and are oriented obliquely in relation to one another, can roll with their running surfaces 11 on the complementary guide surfaces 13 of the running rail 3. Each running-gear mechanism 5 is thus supported in a suspended manner on the running rail 3 by means of the running rollers 9 and can be displaced along a conveying route, corresponding to the course taken by the running rail 3, in order to transport conveyable articles. Conveyable-article carriers of the type shown in FIGS. 1 and 2 can be used, for example, in the clothing industry in order to transport items of clothing on clothes hangers hanging on the carrying rod 7 of a relevant conveyable-article carrier 1.

In the case of the conveying arrangement according to FIG. 1, the drive means of conveyable-article carriers 1 which is provided is a drive belt in the form of a conveying chain or drive chain 15 with driver elements in the form of brushes 17 arranged thereon such that they follow one after the other. The chain 15 normally runs in a chain guide 19 along the running rail 3 and is driven in circulation as an endless loop by a driving gearwheel (not shown). As is illustrated in FIG. 1, the bristles 21 of the brush element 17 project from the bristle carriers 23 transversely to the running direction of the conveyable-article carrier 1 in the region of the conveying route. The bristle carriers 23 are fastened on the drive chain 15. FIG. 1 only shows one of a plurality of brush elements 17 which are provided at intervals from one another along the chain 15. The bristles 21 of a relevant brush element 17 normally engage with a stop region 25 of the conveyable-article carrier 1 in order to drive the conveyable-article carrier 1 along the conveying route as the drive chain 15 runs. In the case of the example, the stop regions are a rear surface region of the leg 6 of the running-gear mechanism bracket 4. Should unintended blockage of a conveyable-article carrier 1 take place on the conveying route, then, after overcoming an opposing force, the bristles 21 of the brush element 17 can move away from the leg 6 and spring past the bracket 4. To this extent, safety-clutch conditions are provided in respect of the mutual engagement between conveyable-article carrier 1 and driver element 17. If, however, in the case of relatively frequent build-ups, the brackets 4 of conveyable-article carriers 1 are subjected to regular contact impact by driver elements 17, then signs of wear on the conveyable-article carriers, on the drive means or on the guide rail cannot be avoided over the long term. Furthermore, such contact impact results in the conveying arrangement being noisy to operate, which is to be avoided.

Figure 3:
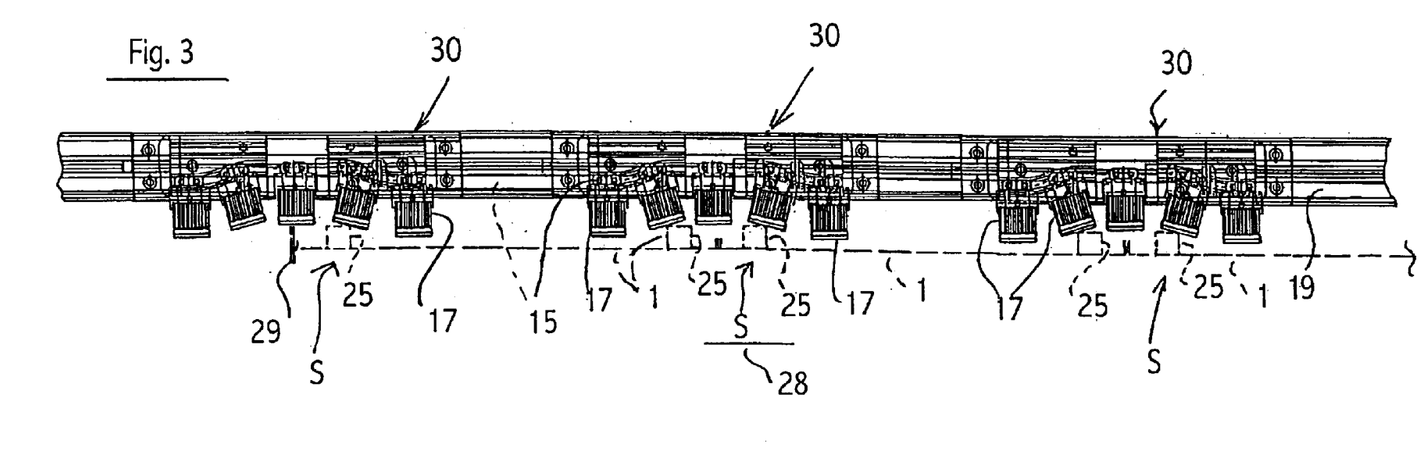
FIG. 3 shows a plan view of a section of the chain-guiding arrangement of a conveying arrangement according to the invention in a partly schematic illustration.

FIG. 3 shows a schematic illustration, in plan view, of a section of the chain-guiding arrangement of a conveying arrangement according to the invention. Only certain sections of the drive chain 15 with brush elements 17 are illustrated in FIG. 3, although the chain 15 runs continuously throughout and is equipped, over its entire chain length, with brush elements 17 preferably arranged at essentially equal intervals.

Conveyable-article carriers 1 are indicated schematically by broken lines in FIG. 3, 25 indicating stop regions of the conveyable-article carriers 1 for the brush elements 17. It is assumed that the conveyable-article carriers 1 in FIG. 3 are guided on a guide rail (not shown in FIG. 3) running in the conveying direction 28. In the illustration according to FIG. 3, the conveyable-article carriers 1 have been built up in a build-up region of the conveying route, a stopper element 29 having been introduced into the path of the conveyable-article carriers 1 in order to form the build-up.

By virtue of the stopper element 29 being activated, means for changing the guide path of the conveying chain, namely deflecting guide elements 30, have been activated by a control arrangement (not shown) in order for the chain 15 in the regions S to be deflected, and moved away, from the relevant conveyable-article carriers and/or the guide rail, in a direction transverse to the conveying direction 28, such that the brush elements 17, at the location S, transfer from their driving position into the non-driving position. The locations S correspond to the locations at which, in the event of a build-up, stop regions 25 of the conveyable-article carriers 1 are located. Since the conveyable-article carriers 1 are of the same length and have the stop regions 25 at corresponding locations of their longitudinal extent, the locations S are determined relative to the stopper element 29. In the non-driving position, the brush elements 17 do not come into active driving engagement with the built-up conveyable-article carriers 1. It may be provided that the brush elements 17 located in the non-driving position do not come into contact with the conveyable-article carriers 1 at all at the locations S. The advantages of the invention, however, are still achieved even when there is easily yielding contact between the conveyable-article carriers 1 and the foremost end regions of the bristles.

Figure 4A:
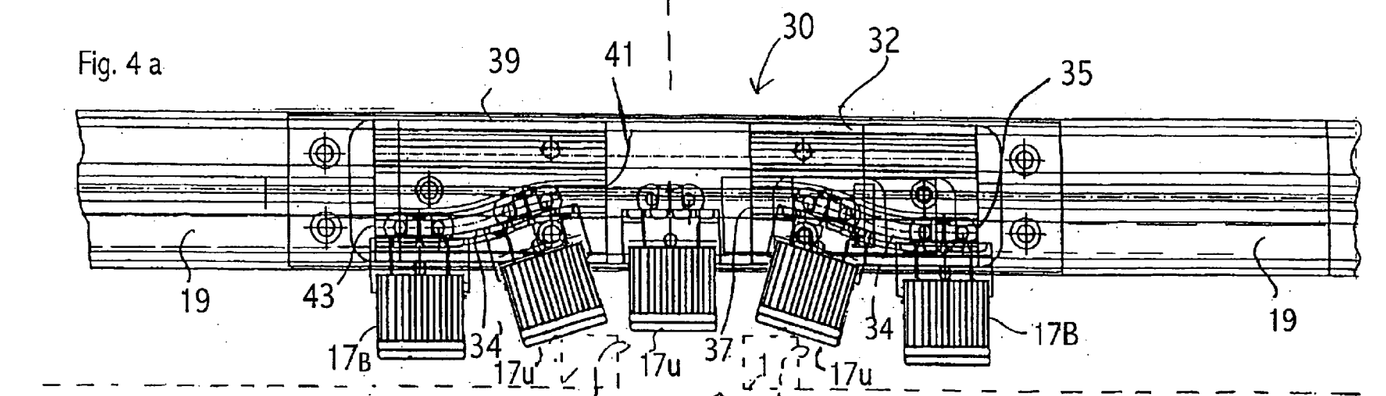
FIG. 4a shows an enlarged illustration of a region from FIG. 3 which comprises a deflecting guide element.

FIG. 4a illustrates a corresponding plan view, on an enlarged scale, of a region from FIG. 3 which comprises a deflecting guide element 30. The deflecting guide element 30 has a carriage element 32 which can be displaced in a guided manner in the longitudinal direction of the conveying route, between two end positions, and contains a chain-diverting guide groove 34. The chain-diverting guide groove 34 has its chain-inlet region 35, which is located at the right-hand end of the carriage element 32 in FIG. 4a, in alignment with the stationary chain-guiding groove 19, which guides the drive chain 15 in the regions outside the deflecting guide elements 30. Starting from the chain-inlet region 35, the chain-diverting guide groove 34, in FIG. 4a, runs to the left and thus, transversely to the conveying direction 28, away from the built-up conveyable-article carriers 1. In the chain-outlet region 37 at the left-hand end of the carriage element 32, the chain-diverting guide groove 34 runs essentially parallel to the conveying direction 28 again, but is offset in relation to the chain-guiding groove 19. Provided opposite the carriage element 32, as seen in the conveying direction, is a stationary diverting element 39, which has a chain-diverting guide groove 34' which, in relation to a center plane X between the elements 32 and 39, runs mirror-symmetrically to the chain-diverting guide groove 34, with the result that the chain section leaving the chain outlet 37 of the carriage element 32 in each case runs more or less rectilinearly into the chain inlet 41 of the element 39, the chain-guiding groove 34' then guiding the chain into the stationary chain-guiding groove 19 again. The chain sections located in each case in the stationary guide groove 19 or in the aligned sections of the chain-diverting guide grooves 34, 34' have brush elements 17 located in the driving position. Of the brush elements illustrated in FIG. 4a, the outer brush elements 17B are located in the driving position, whereas the three brush elements 17U located therebetween have been guided into the non-driving position by the chain-guiding groove 34, 34'. As the drive chain 15 continues running, the brush elements 17 in the region S thus bypass the stop regions 25 of the conveyable-article carriers 1, with the result that the built-up conveyable-article carriers 1 are not subjected to wear-inducing contact impact by the brush elements 17.

Figure 4B:
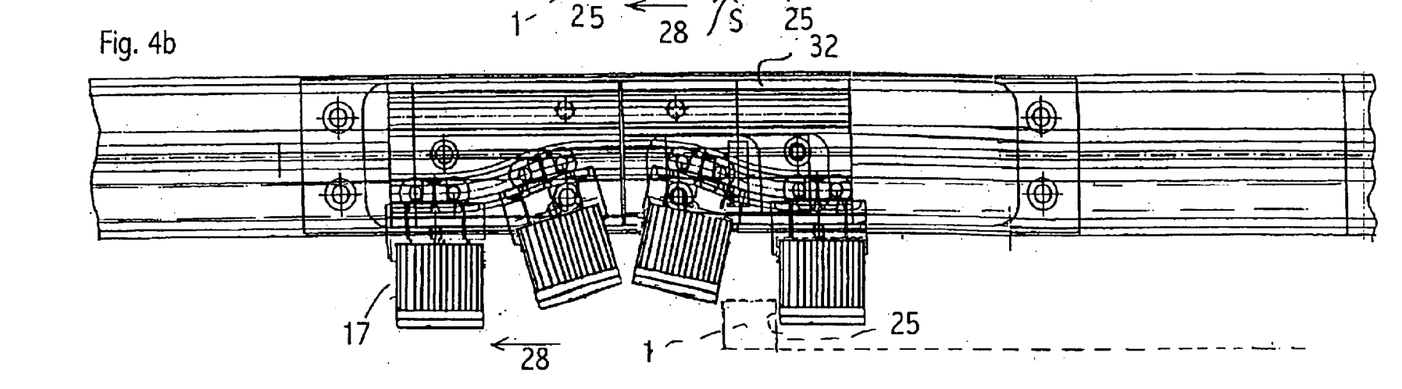
FIG. 4b shows an illustration corresponding to FIG. 4a, although the deflecting guide element is shown in a different position.

If the build-up of conveyable-article carriers 1 according to FIG. 3 is then to be eliminated, the stopper element 29 is removed in a controlled manner from the path of the conveyable-article carriers 1 and, furthermore, the phase relationship between the locations S and the front end of the build-up, defined by the stopper element 29, is eliminated in that the control arrangement (not shown) activates a displacement drive of the carriage elements 32, which displaces the respective carriage element 32 from the position according to FIG. 4a into the other end position according to FIG. 4b. In the position according to FIG. 4b, brush elements 17 come into driving engagement with stop regions 25 of the previously built-up conveyable-article carriers 1, with the result that the conveyable-article carriers 1 are transported in the conveying direction 28. According to a variant of the exemplary embodiment from FIGS. 1 to 4b, the conveying direction may be reversible.

According to a variant of the embodiment of the deflecting guide element 30 from FIGS. 3, 4a and 4b, it may be provided that the element 39 can also be displaced in a controllable manner in the conveying direction. A pneumatic piston/cylinder drive means is preferably used as displacement drive for the carriage element 32. Said drive means may be configured such that it displaces all the carriage elements 32 of a build-up region simultaneously from one end position into the other end position. Alternatively, it may be provided that the displacement drive for the carriage elements 32 can be activated such that carriage elements 32 of a build-up region are moved by it one after the other with a delay from the end position according to FIG. 4a into the end position according to FIG. 4b, for example in order for the conveyable-article carriers 1, which follow directly one after the other in the built-up formation, to be separated from one another as they leave the latter.

A resilient tensioning station, for example, may perform the task of compensating for chain length during the transfer from one end position of the carriage element 32 into the other end position.

Figure 5:
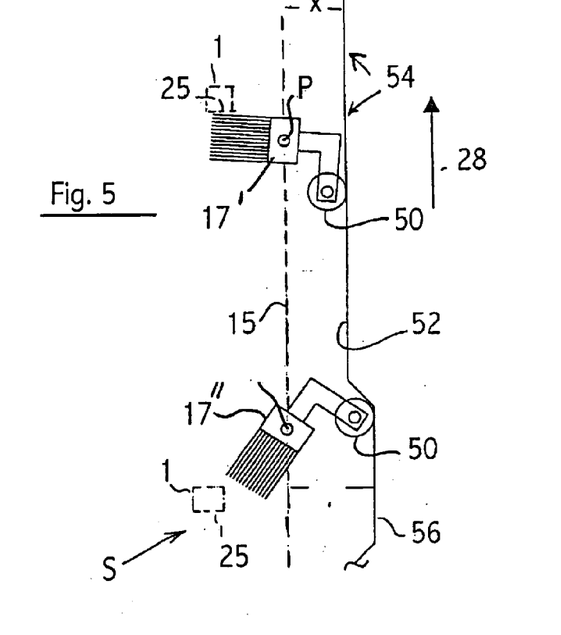
FIG. 5 shows a schematic illustration for the purpose of explaining a second exemplary embodiment according to the invention.

A basic principle of a second exemplary embodiment of the invention will be explained hereinbelow with reference to FIG. 5. FIG. 5 shows a highly schematic and simplified illustration of a section of the drive belt 15 extending along the conveying route. Driver elements 17 are mounted in a pivotable manner on the drive belt 15, with the result that they can be pivoted relative to the drive belt 15, about the pivot pins P, between the driving position and the non-driving position. In contrast to the concept of the first exemplary embodiment, rather than the drive belt as a whole being deflected in order to transfer driver elements into the non-driving position, the driver elements 17 are moved relative to the drive belt 15, which is moved along the conveying route, in order to pass into the non-driving position. In the case of the example of FIG. 5, the driver elements 17 have a respective cam follower 50, by means of which they can follow a cam 52 of a position guiding element 54. The cam 52 normally runs at a certain lateral distance X from the drive belt 15 along the conveying route, as is illustrated in the top part of FIG. 5. In such normal regions of the conveying route, the cam 52 supports the driver elements 17 on the cam followers 50 such that the driver elements 17 are forcibly guided into the driving position during movement along the conveying route. FIG. 5 illustrates the driver element 17' in the situation in which it has been forcibly guided into the driving position by the cam 52, with the result that it can come into driving engagement with the stop region 25 of a conveyable-article carrier 1 (which is only indicated).

In the build-up regions of the conveying route, the cam 52 of an associated position guiding element 54 takes a course as can be seen, for example, in the bottom part of FIG. 5. In the region of the location S, at which, in the event of a build-up, the stop region 25 of a conveyable-article carrier 1 is normally located, the cam 52 is spaced apart from the drive belt 15 by a greater distance Y. This results in it being possible for driver elements 17 to be pivoted in the counterclockwise direction, about the pivot pin P, during transfer into such a section of the conveying route, with the result that they can pass into the non-driving position, as is shown for the driver element 17" in FIG. 5. It is obvious that, as movement continues in the conveying direction 28, the driver element 17" is forced, by the cam 52, into the driving position, in which the driver element 17' is already located.

The position guiding element 54 can preferably be displaced in a controlled manner along the conveying route between two end positions, with the result that, by virtue of the region 56 of the cam 52 being displaced, it is possible to produce the state, for the driver elements 17, where the latter can engage again with conveyable-article carriers which, in the built-up formation, have previously been bypassed by driver elements.

According to a variant of the exemplary embodiment according to FIG. 5, it may be provided that a relevant position guiding element 54, at least in certain sections, can be laterally shifted away from the drive belt 15, and shifted towards the same again, in a controlled manner in order to introduce the driver elements 17 into a desired position (driving position or non-driving position).

In the case of the example according to FIG. 5, the pivot pins P of the driver elements 17 run orthogonally to the drive belt 15. When the conveying route runs horizontally, the pivot pins P are located vertically. According to variants of the embodiment from FIG. 5, it may be provided that the pivot pins of the relevant driver elements 17 are oriented differently, for example in the conveying direction of the drive belt 15.

Further variants of the concept indicated in FIG. 5 for controlling the driver elements are conceivable. For example, it may be provided that driver elements 17 are normally locked in their driving position on the drive belt by means of a locking arrangement, it being possible to provide, in build-up regions of the conveying route, cam elements or the like which can release the locking and reinstate it.

Figure 6:
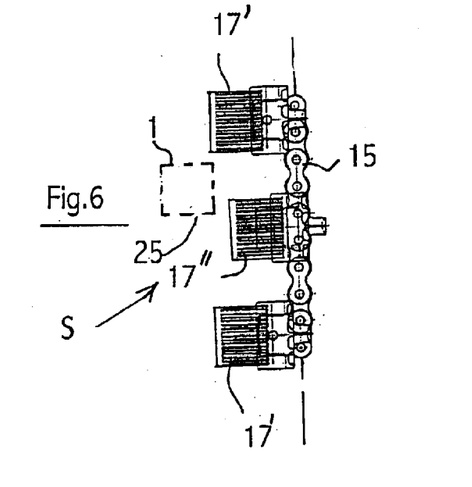
FIG. 6 shows a section of a drive chain with brush elements of a third exemplary embodiment, in plan view.

A third exemplary embodiment of the invention will be explained hereinbelow with reference to FIG. 6. Elements of this exemplary embodiment which correspond in functional terms to elements of the exemplary embodiments which have already been described are provided with the same designations, so reference can largely be made to the description of the exemplary embodiments according to FIGS. 1 to 5. The third exemplary embodiment according to FIG. 6 may be regarded as a variant of the concept described with reference to FIG. 5. In contrast to the exemplary embodiment according to FIG. 5, however, the driver elements 17 of the third exemplary embodiment, rather than being articulated in a pivotable manner on the drive belt 15, are guided on the drive belt 15 such that they can be linearly displaced, transversely to the conveying direction, in a relevant linear guide, with the result that they can be displaced between the driving position (see the driver elements 17' in FIG. 6) and the non-driving position (see the driver element 17" in FIG. 6). The driver elements 17 are preferably prestressed resiliently in the direction of a position, which may also be the case for the driver elements 17 in FIG. 5. In the case of the third exemplary embodiment according to FIG. 6, the driver elements 17 are controlled in accordance with the principle explained in FIG. 5, that is to say by means of cam sections or cam elements, which are not depicted in FIG. 6.

A fourth exemplary embodiment of the invention will be explained with reference to FIGS. 7 and 8. In the case of the fourth exemplary embodiment, the driver elements 17 (brush elements) are fastened on a respective build-up sensor 60, which is fitted in a pivotable manner on the drive belt 15 (drive chain 15) by means of a pivoting mount 62. The pivot pin P runs in the conveying direction in each-case. As can be seen from FIG. 7, the chain guide 19, with the drive chain 15 guided therein and with the articulation arrangement for the pivoting mount 62, is located above the rail-guided conveyable-article carriers 1. The respective pivoting mount 62 is a lever which is mounted such that it can be pivoted about the pivot pin P and, at its free end, has a plate-like contour-follower element which forms the build-up sensor 60. A driver element in the form of a brush element 17 is fastened on that side of the contour-follower plate 60 which is directed away from the pivot pin P. On account of the gravitational force, the pivoting mount is subjected to a torque which loads the driver element 17 in the direction of its driving position according to FIG. 7. It would be conceivable to use a force of a spring or the like to assist the action of gravitational force. Alternatively, it would be possible for a contour-follower element of modified arrangement to be loaded possibly exclusively on account of spring prestressing in the direction of a position which corresponds with the driving position of the driver element.

Figure 7:
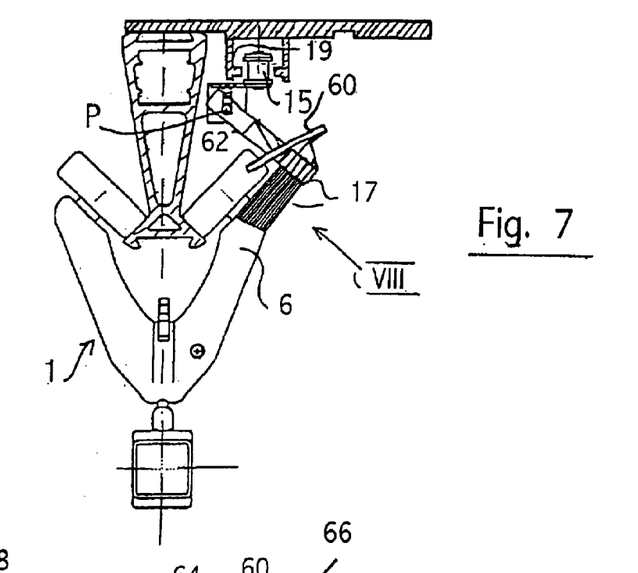
FIG. 7 shows in a view corresponding to FIG. 1 a further exemplary embodiment according to the invention.

In the case of the exemplary embodiment according to FIG. 7, the driver element 17, which has been pivoted into its lowest, driving position, can engage with the top end of the leg 6 of a relevant conveyable-article carrier 1 in order to drive the conveyable-article carrier 1 in the conveying direction. It has been found to be advantageous to allow the driver brushes to act on top regions of the conveyable-article carriers, in order to avoid moments which could result in a tendency to raise the conveyable-article carriers 1 relative to the running rail 3. According to alternative variants of the example from FIG. 7, it may be provided that the driver elements are arranged in some other way on the contour-follower element, and are oriented differently, relative to the conveyable-article carriers engaged by them, than is illustrated in FIG. 7. For example, it may also be provided for the arrangement to be such that the driver brush arranged on a contour-follower element 60 can engage with a relevant conveyable-article carrier with bristles oriented upward, the point of engagement being located possibly in a region of the conveyable-article carrier which is located at a lower level than is illustrated in FIG. 7.

In order to explain the functioning of the build-up sensors formed as contour-follower plates 60, reference will be made hereinbelow to FIG. 8, in which are illustrated schematically four different situations A–D of conveyable-article carriers 1 and contour-follower plates 60, which are carried along in the conveying direction by the drive belt, coming together, said conveyable-article carriers being supported on a guide rail (not shown) by way of their running rollers 9. The illustrations in FIG. 8 show a side view corresponding to the viewing direction indicated at VIII in FIG. 7. The conveyable-article carriers are indicated symbolically in FIG. 8 by an illustration of the top part of a running-gear mechanism 5. The conveyable-article carriers may be of such a nature that they essentially comprise only one such running-gear mechanism 5 with means for fitting conveyable articles. As has already been mentioned, it is also possible for conveyable-article carriers to comprise a plurality of running-gear mechanisms 5 connected to one another by carrying rods or the like.

Figure 8:
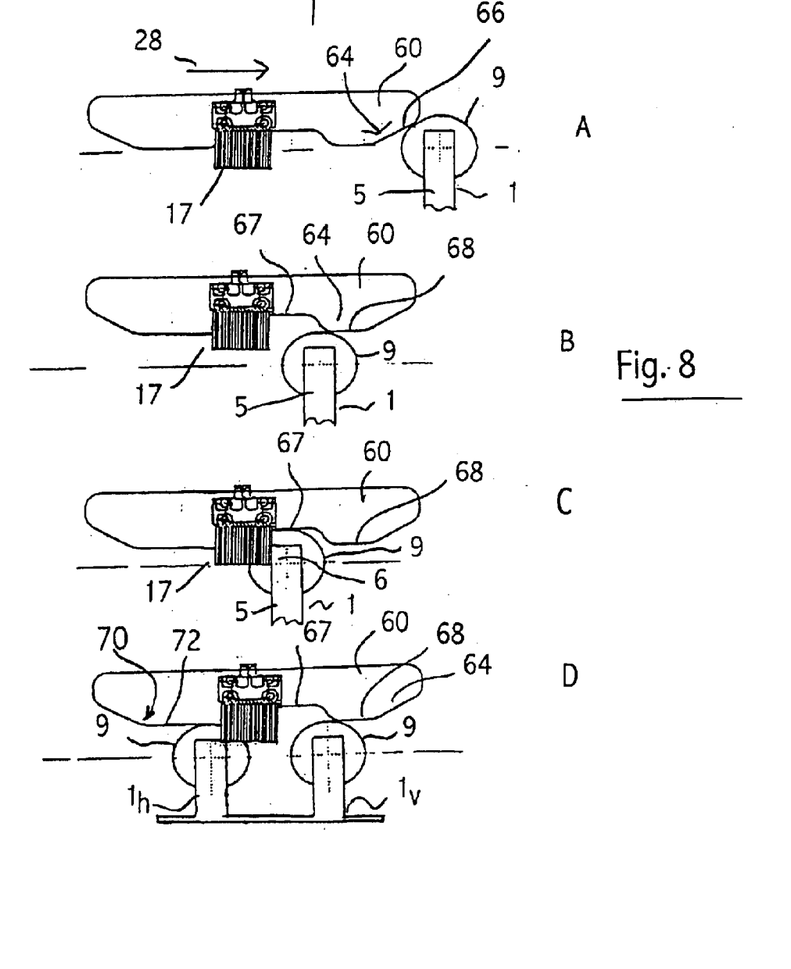
FIG. 8 shows four situations of a contour-follower element of the exemplary embodiment according to FIG. 7 coming together with conveyable-article carriers, the contour-follower element being illustrated in each case in a side view in a direction transverse to the conveying direction.

A in FIG. 8 indicates the situation in which the contour-follower plate 60 approaches a conveyable-article carrier 1 in the conveying direction 28. The contour-follower plate 60 has a cam section 64, which leads in relation to the driver element 17 and has a front oblique surface 66 which, as the contour-follower plate 60 moves closer to the conveyable-article carrier 1, comes into contact with a running roller 9 of the conveyable-article carrier 1. The interaction between the further-advanced contour-follower plate 60 and the running roller 9 results in the contour-follower plate 60 pivoting about the pivot pin P (see FIG. 7), in which case the plate 60, with the driver element 17 fastened thereon, is raised. In this case, the force to which the conveyable-article carrier subjected by the drive belt is still not large enough for the conveyable-article carrier 1 to be driven reliably in the conveying direction.

B in FIG. 8 indicates the situation where the contour-follower plate 60 is in its raised state, with the result that the driver element 17 fastened thereon is in its non-driving position. The contour-follower plate 60 rests on the roller 9 by way of the lowermost border contour 68.

As operation continues, the leading cam section 64 overtakes the running roller 9, with the result that a central cam section 67 comes into contact with the running roller 9 of the conveyable-article carrier 1 (situation C). Since the central cam section 67 is set back relative to the lowermost border contour 68 in the manner of a recess in the contour-follower plate 60, the contour-follower plate 60 can pivot back into the original position again.

The driver element 17 is offset to the rear relative to the center of the contour-follower plate 60, with the result that it can engage with the leg 6 of the conveyable-article carrier 1 once the roller 9 of the conveyable-article carrier has come into contact with the central cam section 67 and the contour-follower plate 60 has resumed its lower pivoting position, which corresponds with the driving position of the driver element 17. The situation C in FIG. 8 corresponds to the normal conveying situation of a conveyable-article carrier 1 which is driven along the conveying route by a driver element 17.

Situation D in FIG. 8 arises in the event of a buildup of conveyable-article carriers 1. In the built-up formation, successive conveyable-article carriers 1 butt against one another, this determining the distance between their running rollers 9 in the conveying direction. The contour-follower plate 60 has a cam section 70, which tails in relation to the driver element 17 and of which the lowermost border contour 72 is located at the same level as the border contour 68 of the leading cam section 64. The distance between the leading cam section 64 and the trailing cam section 70 is coordinated with the distance between the running rollers 9 of two abutting conveyable-article carriers 1 such that the rear conveyable-article carrier $1_h$, as seen in the conveying direction, reaches the rear horizontal border-contour section 72, by way of its running roller 9, before the conveyable-article carrier $1_v$ located in front, as seen in the conveying direction, leaves the front horizontal border-contour section 68 in the direction of the central cam section 67 as the contour-follower plate 60 continues moving. The length of the central cam section 67, as measured in the conveying direction, is thus less than the distance between the rollers 9, which come into contact with the contour-follower plate 60, of conveyable-article carriers 1 following one after the other in the built-up formation. This results in the contour-follower plate 60 remaining in the raised pivoting position as it moves past the built-up conveyable-article carriers 1, with the result that the relevant driver element 17 is retained in the corresponding non-driving position.

Preferably provided at the beginning of a build-up region of the conveying route is a switchable stopper element which, in its active switching position, extends into the path of the conveyable-article carriers, and into the path of the contour-follower elements, such that, on the one hand, it constitutes a barrier for the conveyable-article carriers 1 and, on the other hand, it results in it being possible for the contour-follower elements 60, in the raised pivoting position, to run past the stopper element in order then to transfer into the lower pivoting position again.

It is preferable for at least individual driver elements 17 to be arranged on the pivoting mount 62 such that, even in the non-driving position, they can produce a slight degree of coupling or engagement with conveyable-article carriers 1, which are guided by rails along the conveying route, in order to ensure that a build-up of conveyable-article carriers is dispersed automatically once the stopper element has been drawn back into the passive position. It may thus be provided, for example, that every tenth driver element, even in its non-driving position, can engage (with a slight degree of coupling) with conveyable-article carriers, whereas the driver elements located therebetween cannot produce any coupling with conveyable-article carriers 1 in their non-driving position. Within the context of the invention, it may also be provided that individual driver elements always remain in the driving position, while the driver elements provided between such driver elements can assume the non-driving position, if required, in the manner described.

An advantage of the exemplary embodiment according to FIGS. 7 and 8 is that the drive uncoupling functions automatically even when build-up is formed by chance, since the contour-follower elements 60 switch the driver elements 17 into the passive state whenever the contour over which they pass corresponds to the contour of a group of at least two conveyable-article carriers butting against one another in a built-up formation.

Figure 9:
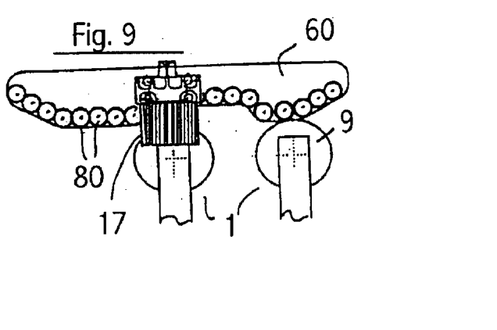
FIG. 9 shows a variant of a contour-follower element as can be used for the exemplary embodiment according to FIG. 7.

According to a variant of the exemplary embodiment from FIGS. 7 and 8, the contour-follower elements may comprise rotatably mounted rollers 80, as is indicated in FIG. 9. As they overtake conveyable-article carriers 1, these rollers 80 come into contact, on their circumferential regions, with the rollers of the conveyable-article carriers 1, in which case they can execute a rotary movement. The solution according to FIG. 9 makes it possible for the contour-follower elements 60 to move past the conveyable-article carriers 1 with a lower level of friction.

The exemplary embodiment according to FIGS. 7 and 8 can be realized in further variants. For example, it is conceivable for the contour-follower elements 60 to come into contact, not with rollers of conveyable-article carriers 1, but with other predetermined contour regions which, in the event of a build-up, provide a defined distance between successive conveyable-article carriers, this distance and the distance between the leading cam section and the trailing cam section of the contour-follower element being coordinated with one another in the manner described.

What is claimed is:

1. A conveying arrangement, in particular a suspension-type conveying arrangement, having rails (3) for guiding conveyable-article carriers (1), equipped with running rollers (9), along a conveying route, having a drive belt (15) which is driven in circulation about diverting means, is guided along the conveying route, at least in certain regions, by means of a guide arrangement (19) and has driver elements (17) which are arranged on it and, in a driving position, are suitable, and envisaged, for driving rail-guided conveyable-article carriers (1) along the conveying route, and having means (29) for stopping conveyable-article carriers in a build-up region of the conveying route as the drive belt (15) continues running, it being the case that the conveying arrangement has position-changing means which can be activated in a controlled manner and are intended for transferring driver elements (17) of the drive belt (15) from their driving position into a non-driving position in the build-up region, it being possible for the driver elements (17) located in the non-driving position, if appropriate, only to engage to a slight extent, if at all and the easily yielding action with built-up conveyable-article carriers (1), characterized in that the position-changing means have controllable means for changing the guide path of the drive belt (15) which are designed for diverting the drive belt (15) in the build-up region of the conveying route optionally from a path in which the driver elements are guided into the driving position into a path in which the driver elements are guided into the non-driving position.

2. The conveying arrangement as claimed in claim 1, the conveyable-article carriers (1) having stop regions (25) which may be subjected to the action of driver elements (17) for the driving coupling between conveyable-article carriers (1) and drive belt (15), characterized in that the means for changing the guide path in the build-up region are arranged, and can be activated along the conveying route such that they divert the drive belt (15) at predetermined locations, into the path in which the driver elements (17) are guided into the non-driving position, the predetermined locations corresponding to the locations at which, in the event of a build-up of conveyable-article carriers (1), the stop regions (25) of the built-up conveyable-article carriers (1) are located.

3. The conveying arrangement as claimed in claim 1, characterized in that the means for changing the guide path have deflecting guide elements (30) which deflect the drive belt (15) locally in a guided manner into a path in which the driver elements (17) are guided into the non-driving position, and in that the deflecting guide elements (30), in a respective displacement region, comprise parts (32), which can be displaced in a controlled manner along the conveying route, in order to vary the respective location of the deflection of the drive belt (15).

4. The conveying arrangement as claimed in claim 1, characterized in that the driver elements (17) have driver fingers which can be deflected with elastic yielding action.

5. The conveying arrangement as claimed in claim 1, characterized in that the driver elements (17) comprise brush elements with driver bristles.

6. The conveyable-article carrier as claimed in claim 1, characterized in that individual driver elements always remain in the driving position.

* * * * *